United States Patent [19]
Higuchi et al.

[11] Patent Number: 5,303,354
[45] Date of Patent: Apr. 12, 1994

[54] DATA TRANSFER SYSTEM BETWEEN REGISTERS FOR MICROCOMPUTER

[75] Inventors: Ryohei Higuchi; Shigeo Mizugaki, both of Hyogo, Japan

[73] Assignee: Mitsubishi Denki Kabushiki Kaisha, Tokyo, Japan

[21] Appl. No.: 909,868

[22] Filed: Jul. 7, 1992

[30] Foreign Application Priority Data

Jul. 8, 1991 [JP] Japan .................................. 3-193504

[51] Int. Cl.⁵ .............................................. G06F 9/00
[52] U.S. Cl. .................................... 395/325; 395/800; 395/375; 364/260.2; 364/DIG. 1; 364/951; 364/DIG. 2
[58] Field of Search ............... 395/325, 725, 250, 375, 395/800; 364/260.2, DIG. 1, 951, DIG. 2

[56] References Cited

U.S. PATENT DOCUMENTS

| | | | |
|---|---|---|---|
| 4,306,285 | 12/1981 | Moriya et al. | 395/375 |
| 4,630,195 | 12/1986 | Hester et al. | 395/375 |
| 4,853,849 | 8/1989 | Bain, Jr. et al. | 395/400 |
| 4,916,601 | 4/1990 | Kelly et al. | 395/375 |
| 4,991,086 | 2/1991 | Kojima | 395/375 |

OTHER PUBLICATIONS

*Introduction to VLSI Systems*, Chapter 5, 1981.

Primary Examiner—Allen R. MacDonald
Assistant Examiner—Glenn A. Auve
Attorney, Agent, or Firm—Townsend & Townsend Khourie & Crew

[57] ABSTRACT

Data is transferred directly from a source register in a register file connected to a data bus from a destination register in the register file, through a read data latch, a data bus bypass mechanism, and a write data latch. Since the data bus is bypassed, the update of a data pointer is possible concurrently with the transfer of data between the source register and the destination register.

7 Claims, 8 Drawing Sheets

DATA TRANSFER SYSTEM BETWEEN REGISTERS FOR MICROCOMPUTER

BACKGROUND OF THE INVENTION

1. Field of the Invention

The present invention relates to a microcomputer having a register file formed by a built-in RAM, and more particularly, to a data transfer system between registers for the microcomputer which can speed up data transfer between registers in the register file.

2. Description of the Prior Art

Figure 5:
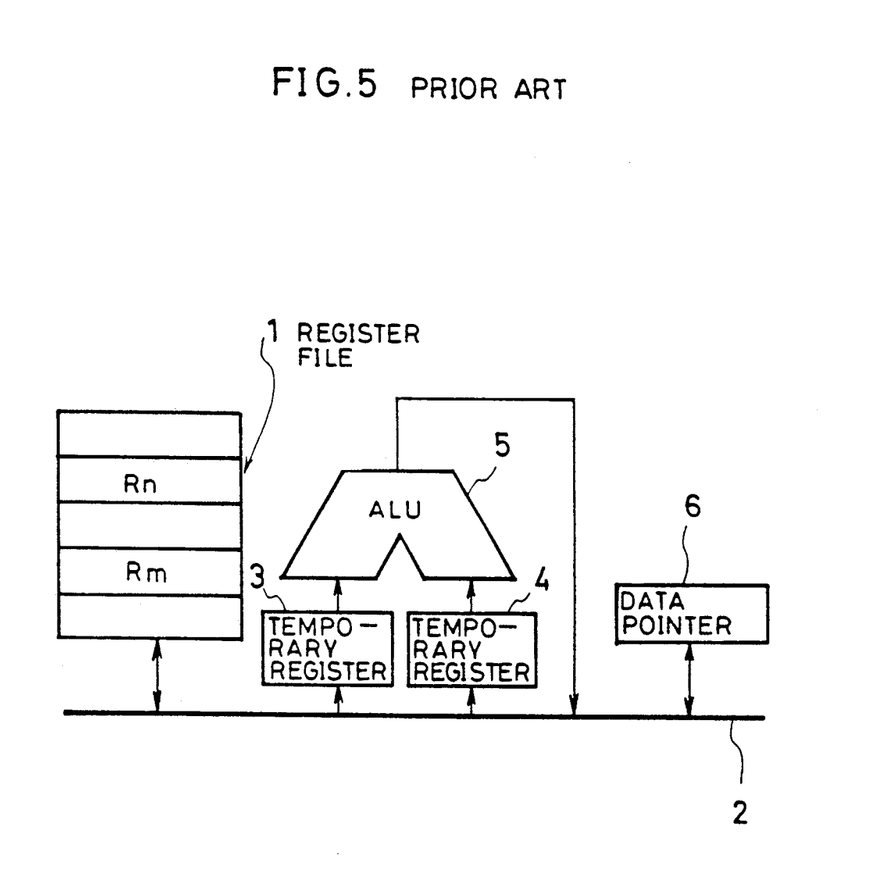
FIG. 5 is a block diagram of the configuration of a conventional microcomputer.

FIG. 5 is a block diagram of the configuration of a microcomputer having a register file formed by a conventional built-in RAM. In the figure, reference numeral 1 represents the register file formed by the built-in RAM, 2 an internal data bus, 3 and 4 temporary registers, 5 an arithmetic logic unit (abbreviated as ALU hereinafter) for performing various operations on data inputted from the internal data bus 2 through the temporary registers 3 and 4 and outputting the results of operations to the internal data bus 2, and 6 a data pointer for holding an address for specifying a register in the register file.

The operation of the conventional microcomputer shown in FIG. 5 when instructions to perform the processing of data transfer between registers in the register file 1 and the processing of incrementing the data pointer are executed will be explained hereafter. The contents of the instructions to be executed are to transfer data stored in the register Rm in the register file 1 to a register (Rn for example) specified by the data pointer 6 and to increment the data pointer by one. The mnemonic of the instructions is MOV Rm, @+1. To execute the instructions MOV Rm, @+1, two operations by the ALU 5 are required. The first operation is for the transfer of data stored in the register Rm to the register Rn, and the second operation for incrementing the data pointer 6.

Figure 6:
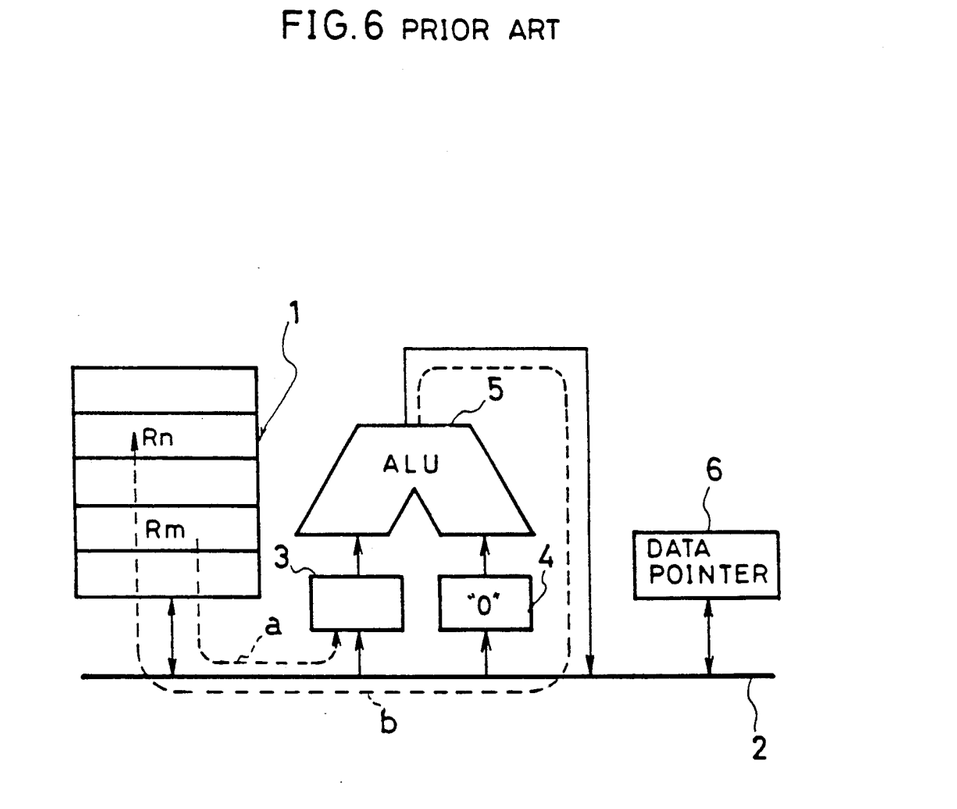
FIG. 6 is a diagram illustrating signal flows when an instruction is executed by the microcomputer of FIG. 5.
Figure 7:
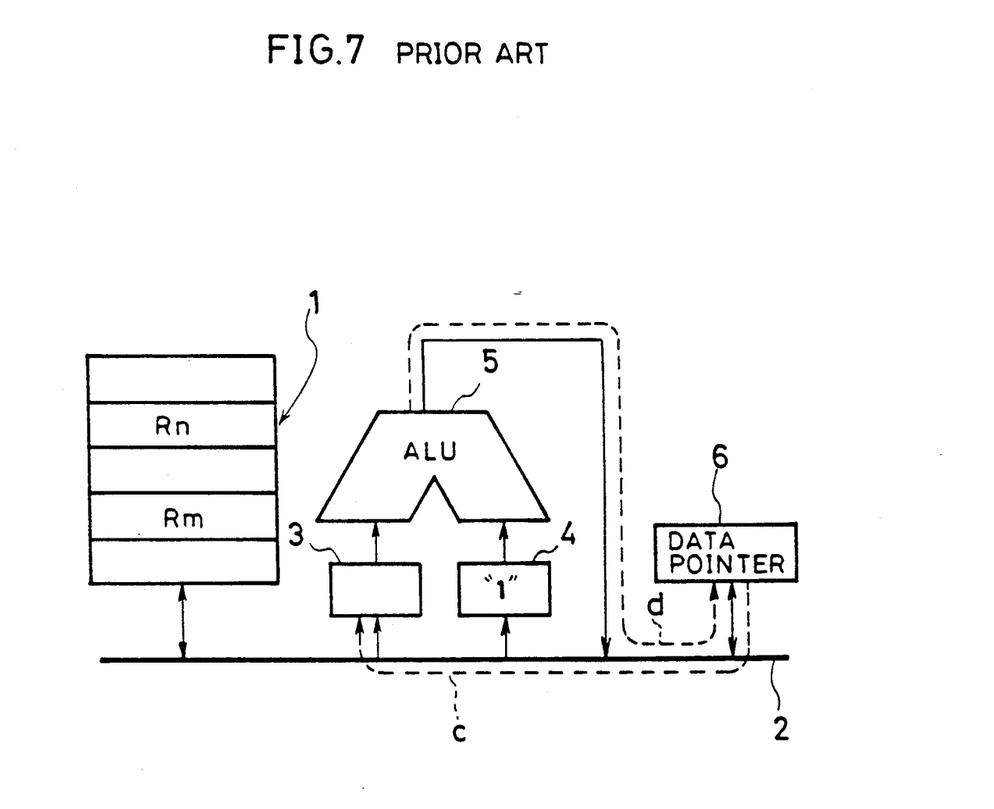
FIG. 7 is a diagram illustrating signal flows when an instruction is executed as in FIG. 6.

FIG. 6 and FIG. 7 are diagrams illustrating data flows for these two operations by the ALU 5, and constituent circuits are the same as those shown in FIG. 5. For the first operation, data stored in the register Rm of the register file 1 is first read and stored in the temporary register 3 through the internal data bus 2 (dotted line a of FIG. 6). Thereafter, a constant data "0" is set in the temporary register 4 by an unshown control section, and the ALU 5 is controlled by this unshown control section so that the logical sum (OR) of both data in the temporary registers 3 and 4 is calculated by the ALU 5. Finally, data outputted from the ALU 5 is transferred to the register file 1 through the internal data bus 2 and written in the register Rn (dotted line b of FIG. 6).

Then, for the second operation of the ALU 5, the processing of incrementing the data pointer 6 by one is performed. First, the contents of the data pointer 6 are stored in the temporary register 3 through the internal bus 2 (dotted line c of FIG. 7). Thereafter, a constant data "1" is set in the temporary register 4 by the unshown control section, and the ALU 5 is controlled by the unshown control section, whereby the addition of both data in the temporary registers 3 and 4 is performed. Finally, data outputted from the ALU 5 is written back in the data pointer 6 through the internal data bus 2 as the result of addition (dotted line d of FIG. 7).

Figure 8:
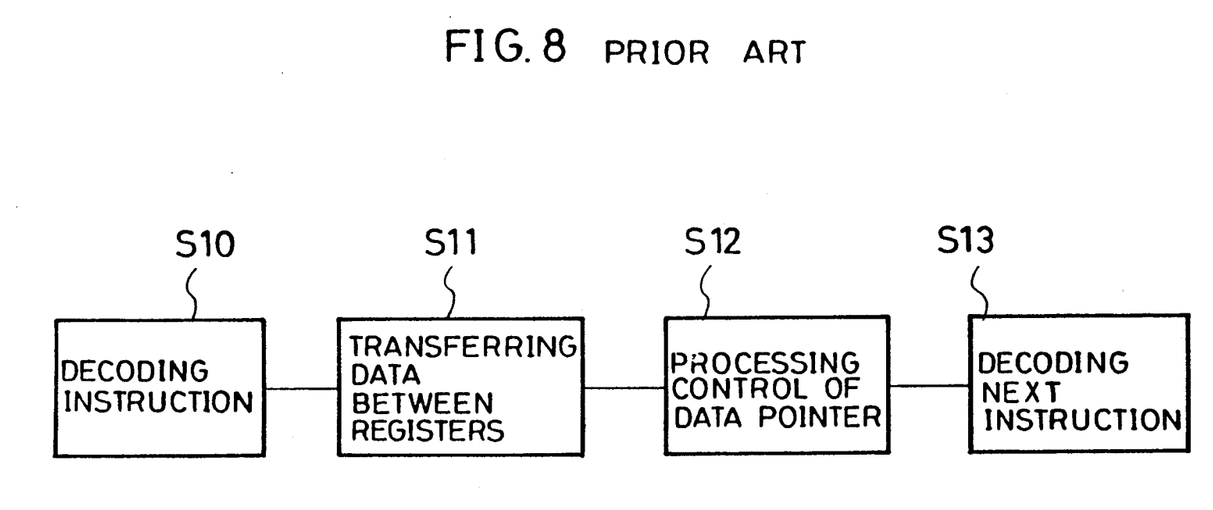
FIG. 8 is a time series diagram illustrating the outline of data processing for the execution of the instructions of FIG. 6 and FIG. 7.

FIG. 8 shows the processing steps of data transfer between registers in the conventional microcomputer described above which are arranged in sequence of time. An instruction to transfer data was decoded by an unshown instruction decoding section (step S10), data transfer between registers was carried out (step S11), the processing of controlling the data pointer was performed (step S12), and the next instruction was decoded by the unshown instruction decoding section.

In the conventional microcomputer as described above, in case of data transfer between registers in the register file, the processing of controlling the data pointer (step S12) was performed after data transfer between registers (step S11). In other words, in case of data transfer from a source register to a desired destination register, data read from the source register was written in the destination register through the operation of the ALU. Because of this, data transfer speed between the registers is slow. In addition, hardware resources such as the ALU and the temporary registers could not be used during data transfer because the ALU, the temporary registers and the internal bus were used for this simple transfer operation unaccompanied by data processing such as addition and subtraction.

SUMMARY OF THE INVENTION

The present invention has been worked out to solve the above problems, and it is an object of the present invention to provide a data transfer system between registers for a microcomputer which can bypass the ALU to transfer data between registers in a register file with a simple structured circuit, thus making it possible to speed up data transfer between registers in the register file and use hardware resources such as the ALU during data transfer between registers for another purpose concurrently with data transfer between registers.

Figure 1:
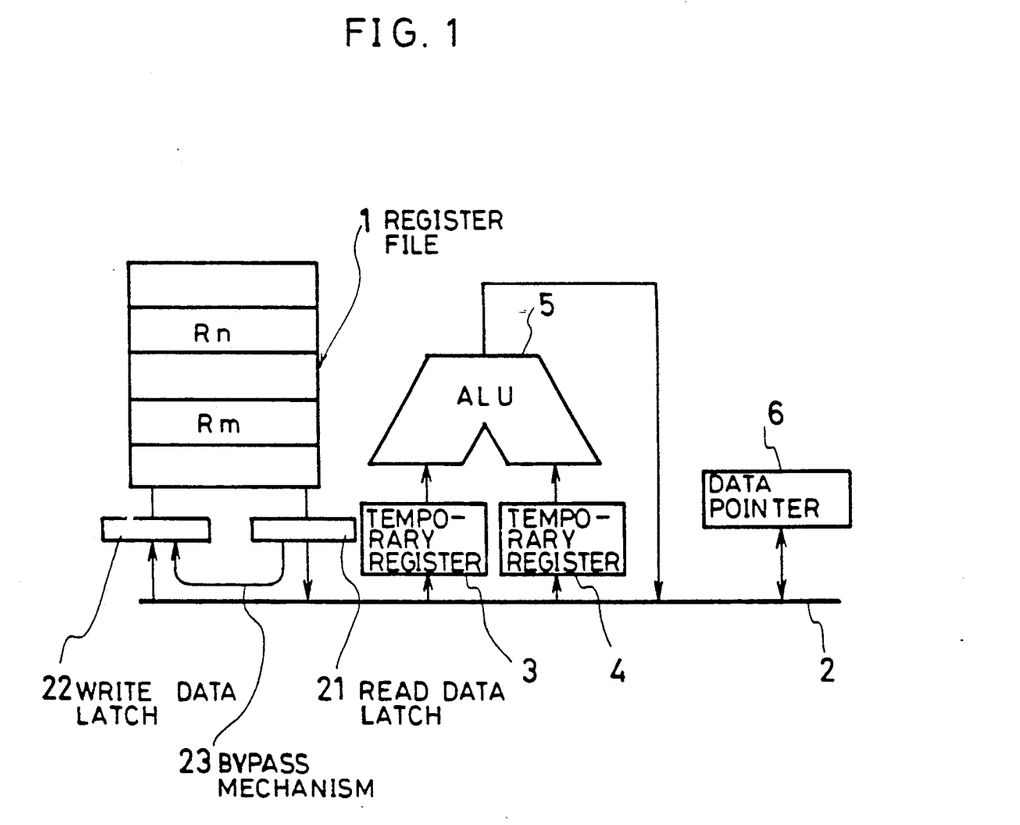
FIG. 1 is a block diagram of the configuration of a microcomputer according to an embodiment of the present invention.

In a data transfer system between registers for a microcomputer according to the present invention, as shown in FIG. 1, there are provided a read data latch 21 for latching data read from a desired register Rm in the register file 1, a write data latch 22 for latching data to be written in the destination register in the register file 1, and a bypass mechanism 23 for bypassing the data bus to directly transfer data latched by the read data latch to the write data latch.

Figure 4:
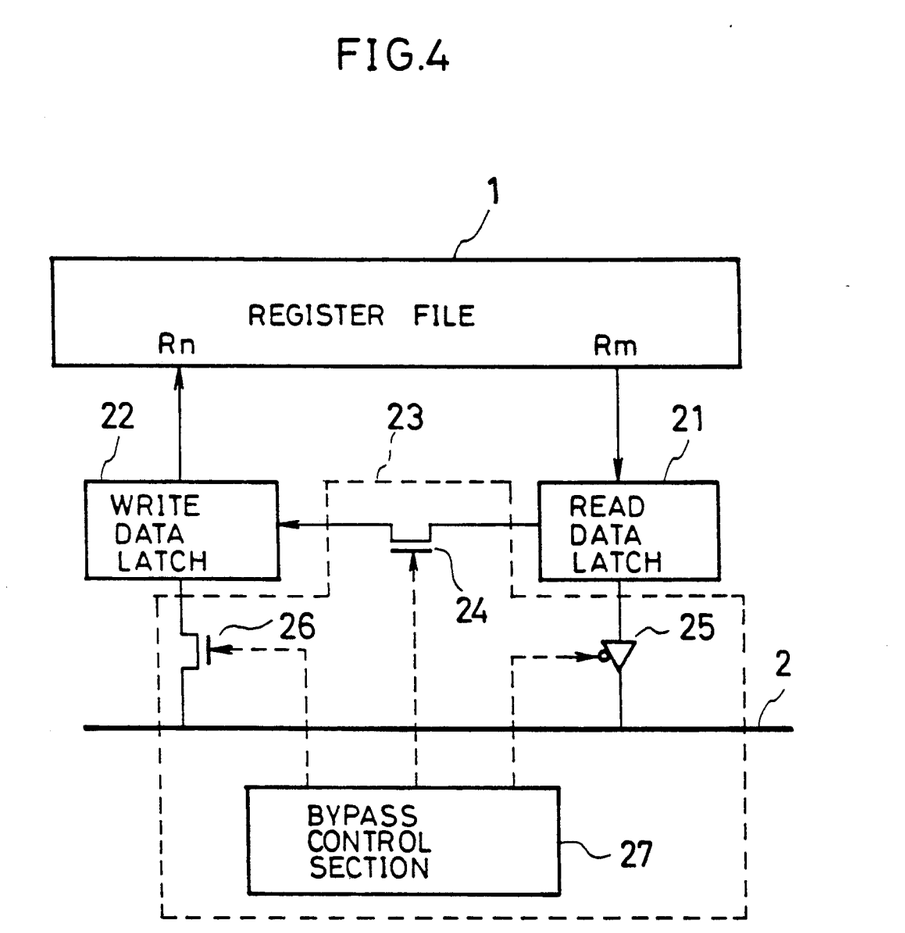
FIG. 4 is a circuit diagram showing an example of the bypass mechanism in a microcomputer according to another invention.

Furthermore, in a data transfer system between registers for a microcomputer according to another invention, as shown in FIG. 4, the above-mentioned bypass mechanism comprises a first gate (gate 24) for intercepting or passing data to be transferred from the aforementioned read data latch to the aforementioned write data latch, a second gate (gate 25) for intercepting or passing data to be transferred from the read data latch to the data bus, a third gate (gate 26) for intercepting or passing data to be transferred from the data bus to the write data latch, and a bypass control circuit 27 for controlling these first, second and third gates.

In the data transfer system between registers for a microcomputer of the first invention structured above, the processing of directly transferring data from the above-mentioned desired register to the aforementioned destination register through the above-mentioned read data latch, bypass mechanism and write data latch and the processing of controlling the above-mentioned data pointer are performed concurrently.

Furthermore, in the data transfer system between registers for a microcomputer of the second invention, when bypassing data is instructed by an unshown control section, the bypass control section 27 closes the second and third gates to prevent data from being inputted and outputted from the above-mentioned read data latch and the aforementioned write data latch to the data bus and opens the above-mentioned first gate to bypass the data.

As explained in the foregoing, in the data transfer systems between registers for a microcomputer according to these inventions, data transfer between registers in the register file is performed bypassing the ALU by the data latch for reading data in the built-in RAM, the data latch for writing data in the built-in RAM, and the bypass mechanism between these latches, whereby high-speed data transfer between registers is made possible with a simple structure. Moreover, during data transfer between registers, hardware resources such as the ALU can be used concurrently with data transfer between registers.

The above and other objects, features and advantages of the invention will be become more apparent from the following description when taken in conjunction with the accompanying drawings.

DESCRIPTION OF THE PREFERRED EMBODIMENT

Now referring to the accompanying drawings, the present invention will be explained hereafter. FIG. 1 is a block diagram of the configuration of a microcomputer according to an embodiment of the present invention. In the figure, reference numeral 1 represents a register file formed by a built-in RAM, 2 an internal data bus, 3 and 4 temporary registers, and 6 a data pointer, all of which are functionally the same as those of FIG. 5. 21 represents a read data latch, 22 a write data latch, and 23 a bypass mechanism.

The read data latch 21 reads data from a desired register (Rm for example) in the register file 1 and latches the data by means of an unshown control section. The write data latch 22 writes the latched data in the destination register (Rn for example) in the register file 1 by means of the above-mentioned control section. The bypass mechanism 23 allows the data latched by the read data latch 21 to bypass the internal data bus 1 to the write data latch 22 by means of the above-mentioned control section.

Figure 2:
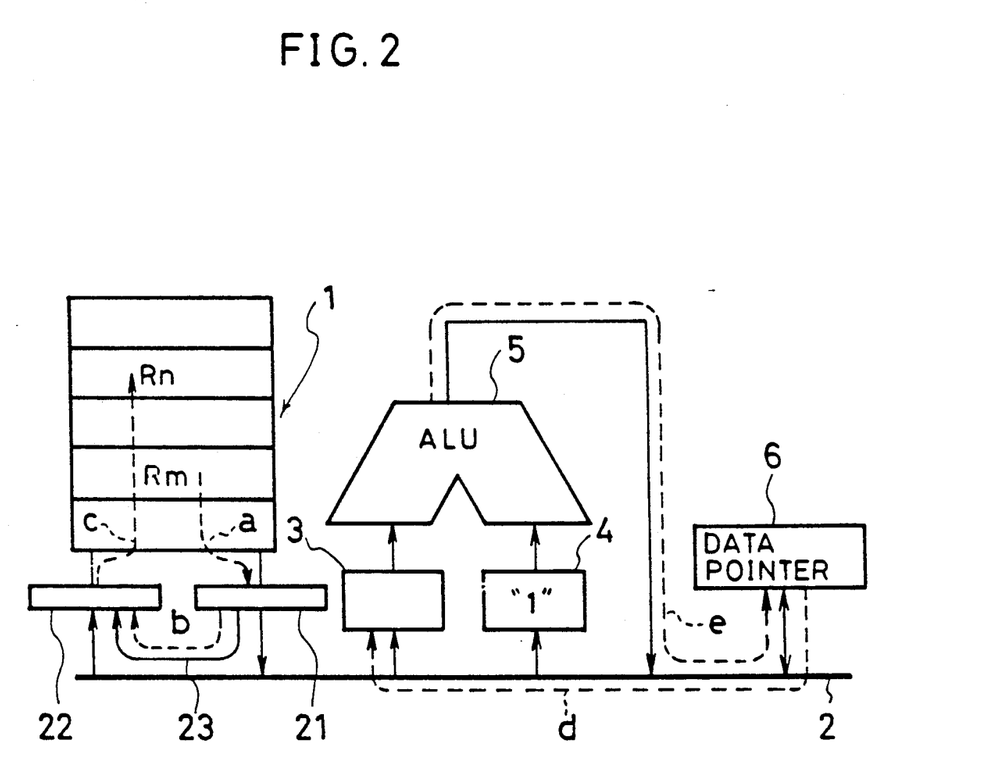
FIG. 2 is a diagram illustrating signal flows when an instruction is executed by the microcomputer of FIG. 1.
Figure 3:
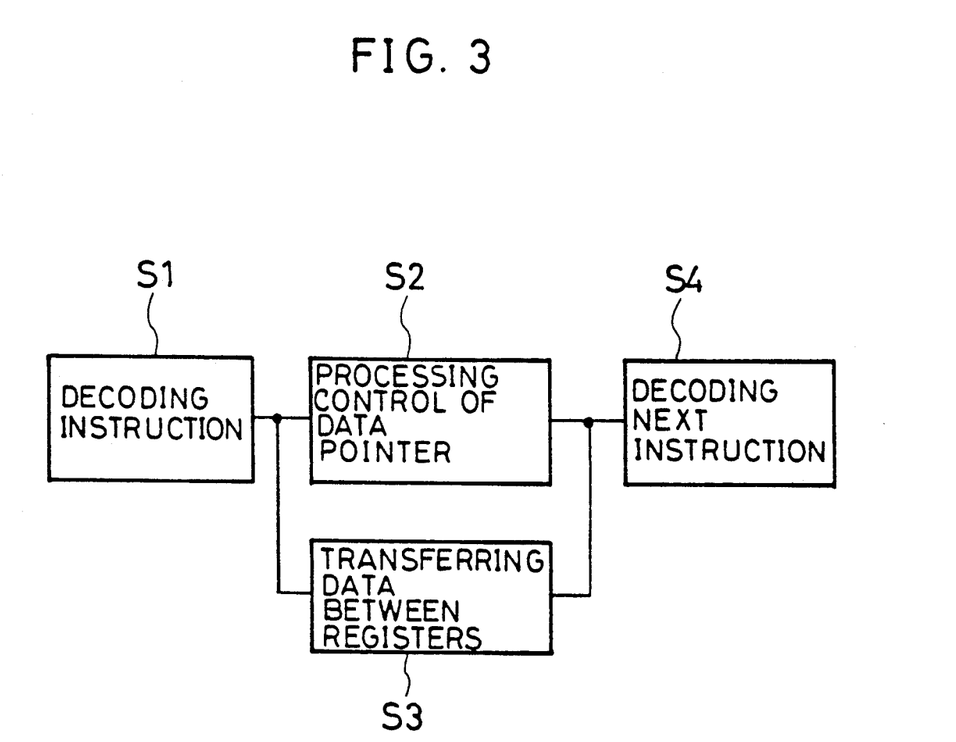
FIG. 3 is a time series diagram illustrating the outline of data processings for the execution of the instruction of FIG. 2.

FIG. 2 is a diagram illustrating signal flows when an instruction is executed by the microcomputer of FIG. 1. FIG. 3 is a time series diagram illustrating the outline of data processings for the execution of the instruction of FIG. 2. The operation of this embodiment will be explained hereafter with reference to FIG. 2 and FIG. 3. When the same instruction MOV Rm, @+1 (instruction to transfer data between desired registers) as the prior art described previously is executed, the instruction is decoded by an unshown instruction decoding section through the control of the unshown control section, converted into a control signal by an unshown control signal generating section, and supplied to the register file 1, the temporary registers 3 and 4, the ALU 5, the data pointer 6, the read data latch 21, the write data latch 22 and the bypass mechanism 23. Data in the register Rm in the register file 1 is first read by the read data latch 21 (dotted line a of FIG. 2). Thereafter, the data of the register Rm read by the read data latch is not directly outputted to the internal data bus 2, but bypassed to the write data latch 22 by the bypass mechanism 23 (dotted line b of FIG. 2). Then, the data is immediately written in a register (Rn in the register file 1) specified by the data pointer 6 (dotted line c of FIG. 2).

Meanwhile, the data of the data pointer is written in the temporary register 3 through the internal data bus 2 (dotted line d of FIG. 2). Then, a constant data "1" is set in the temporary register 4 by the unshown control section. The ALU 5 is controlled by the unshown control section to add the constant data "1" of the temporary register 4 and the data of the temporary register 3. The result of the addition is written back in the data pointer 6 through the internal data bus 2, and the processing of incrementing the data pointer is performed. The data specified by the data pointer 6 indicates the address of a register in the register file 1 to be used for the next instruction.

FIG. 3 is a time series diagram illustrating the outline of the operations described above. The instruction MOV Rm, @+1 is decoded by the unshown instruction decoding section (step S1), "1" is added to the data of the data pointer 6, and the result of the addition is written back in the data pointer to perform the processing of controlling the data pointer (step S2). The next instruction is decoded by the unshown decoding section (step S4). The data of the register Rm in the register file 1 is read by the read data latch 21, bypassed to the write data latch 22 by the bypass mechanism 23, and transferred to the register Rn in the register file 1 by the write data latch 22 (step S3).

In this way, when data is transferred between registers in the register file 1 (step S3) according to the above-mentioned data transfer system, the ALU 5, the temporary registers 3 and 4, and the internal data bus 1 are not used during the processing of this step S3. Therefore, the processing of incrementing the data pointer 6 can be performed concurrently with data transfer between registers, thus making it possible to speed up data transfer between registers.

FIG. 4 is a circuit diagram of an example of the bypass mechanism for transferring data between registers in the register file according to another invention. In the figure, 24 represents a first gate, 25 a second gate, 26 a third gate, and 27 a bypass control section for controlling gates 24 to 26 of the bypass mechanism 23. The register file 1, the internal data bus 2, the read data latch 21 and the write data latch 22 have the same functions as those shown in FIG. 1 and FIG. 2.

The gate 24 passes or intercepts data to be transferred from the read data latch 21 to the write data latch 22 through the ON/OFF operation thereof. The gate 25 passes or intercepts data latched by the read data latch 24 through the ON/OFF operation thereof. The gate 26 passes or intercepts data latched by the write data latch 26 through the ON/OFF operation thereof. The bypass control section 27 prevents data latched by the read data latch 21 and the write data latch 26 from being inputted and outputted to the data bus 2 by closing the gates 25 and 26, and bypasses the latched data from the read data latch 21 to the write data latch 22 by opening the gate 24.

When data is transferred from the register Rm to the register Rn in the register file 1, the data in the register Rm is read and latched by the read data latch 21. The data latched by the read data latch 21 is bypassed to the write data latch 22 by opening the gate 24 by means of the bypass control section, and latched by the write data latch 22. Then, the latched data is written in the register Rn in the register file 1 by the write data latch 22. During the transfer of the data from the register Rm to the register Rn, the gates 25 and 26 are closed by the bypass control section 27 so that the data latched by the read data latch 21 and the write data latch 22 are not outputted to the internal data bus 2.

The above-mentioned embodiment has only a single internal bus, but a CPU which has two separate buses for transferring data from a source register to a destination register or three separate buses for transferring data from two source registers to one destination register may be used. In the above embodiment, during data transfer between registers in the register file, the processing of incrementing the data pointer is performed. However, during data transfer between registers, the processing of executing the next instruction using unused hardware resources such as the ALU may be performed.

As described in the foregoing, according to the first invention, the read data latch for latching data read from a desired register, the write data latch for latching data to be written in a destination register in a register file, and the bypass mechanism for directly transferring the data latched by the read data latch to the write data latch bypassing the data bus are provided, whereby data can be transferred between registers in the register file bypassing the ALU. Therefore, this invention has the advantageous effect that high-speed data transfer between registers in the register file is possible. Furthermore, this invention has another effect that during data transfer between registers in the register file, hardware resources such as the ALU can be used for an operation other than data transfer.

According to the second invention, the bypass mechanism comprises the first gate for intercepting or passing data to be transferred from the read data latch to the write data latch, the second gate for intercepting or passing data to be transferred from the read data latch to the data bus, the third gate for intercepting or passing data to be transferred from the data bus to the write data latch, the bypass control circuit for controlling these first, second and third gates, thus having the effect that the bypass mechanism can be constructed by a simple circuit, in addition to the effect of the first invention.

What is claimed is:

1. A data transfer system for transferring data between registers in a microcomputer, comprising:
   a data bus;
   a plurality of registers organized as a register file;
   a read data latch coupling the data bus to a first selected register in the register file, the read data latch including a control input, wherein a read signal asserted on the control input of the read data latch causes the read data latch to apply contents of the first selected register to the data bus;
   a write data latch coupling the data bus to a second selected register in the register file, the write data latch including a control input, wherein a write signal asserted on the control input of the write data latch causes the write data latch to apply contents of the data bus to the second selected register; and
   bypass control means, coupled between the read data latch and the write data latch, for transferring the contents of the read data latch to the write data latch in response to a bypass signal, wherein said bypass control means bypasses the data bus in making the transfer.

2. The data transfer system of claim 1, the bypass control means further comprising:
   a first gate, coupled between the read data latch and the write data latch, which is conductive in response to the bypass signal being asserted;
   a second gate, coupled between the read data latch and the data bus, for passing data from the read data latch to the data bus in response to a read control signal;
   a third gate, coupled between the write data latch and the data bus, for passing data from the data bus to the write data latch in response to a write control signal; and
   a bypass control circuit with signal output lines to output the bypass control signal to the first gate, the read control signal to the second gate, and the write control signal to the third gate, such that, during a bypass operation, the first gate is enabled, the second gate is disabled, and the third gate is disabled.

3. The data transfer system of claim 1, further comprising:
   an arithmetic logic unit (ALU), coupled to the data bus;
   a data pointer register coupled to the data bus, which data pointer register selects at least one of the first selected register and the second selected register; and
   data pointer updating means, coupled between the data pointer register and the ALU, for updating the data pointer register concurrently with the transfer of data from the first selected register to the second selected register.

4. The data transfer system of claim 3, wherein an instruction from said bypass control means to bypass data from the read data latch to the write data latch is executed concurrently with the updating of the data pointer register.

5. The data transfer system of claim 3, wherein the data pointer register points to the second selected register.

6. The data transfer system of claim 1, the bypass control means further comprising:
   a gate coupled between the read data latch and the write data latch which is conductive in response to the bypass signal being asserted.

7. The data transfer system of claim 6, wherein the gate is conductive concurrently with the transfer of data from the first selected register to the second selected register.

* * * * *